United States Patent [19]

van Daalen

[11] 4,080,773

[45] Mar. 28, 1978

[54] APPARATUS FOR FILLING A RECEPTACLE, PARTICULARLY WITH SPINNING BOBBINS

[75] Inventor: Peter van Daalen, Hengelo (O), Netherlands

[73] Assignee: B.V. Machinefabriek M. Brouwer & Co., Hengelo (O), Netherlands

[21] Appl. No.: 768,144

[22] Filed: Feb. 14, 1977

[30] Foreign Application Priority Data

Feb. 24, 1976 Netherlands .......................... 7601888

[51] Int. Cl.² ............................................ B65B 35/22
[52] U.S. Cl. ..................................... 53/142; 53/59 R; 53/164
[58] Field of Search ................. 53/142, 59 R, 164, 158

[56] References Cited

U.S. PATENT DOCUMENTS

| 3,005,299 | 10/1961 | Dietiker | 53/142 X |
| 3,512,336 | 5/1970 | Rosecrans | 53/164 |
| 3,641,735 | 2/1972 | Daily et al. | 53/164 X |
| 3,729,895 | 5/1973 | Kramer et al. | 53/59 R |

Primary Examiner—Travis S. McGehee
Attorney, Agent, or Firm—Eyre, Mann, Lucas & Just

[57] ABSTRACT

Apparatus for filling a receptacle with oblong articles such as spinning bobbins and the like, the articles having an identical shape and being parallel with respect to each other, a feed path for articles having a directing device at its receiving end, directing them to a receptacle, being an oblong intermediate space or container subdivided into compartments by partitions extending in a direction transverse to the longitudinal direction of the intermediate space or container, as far as the bottom of the same, while in a longitudinal direction over the surface of said feed path, a pair of guide rulers are arranged, movable from a position in which the articles are guided toward a particular compartment, to a position in which the articles are guided toward another compartment.

12 Claims, 8 Drawing Figures

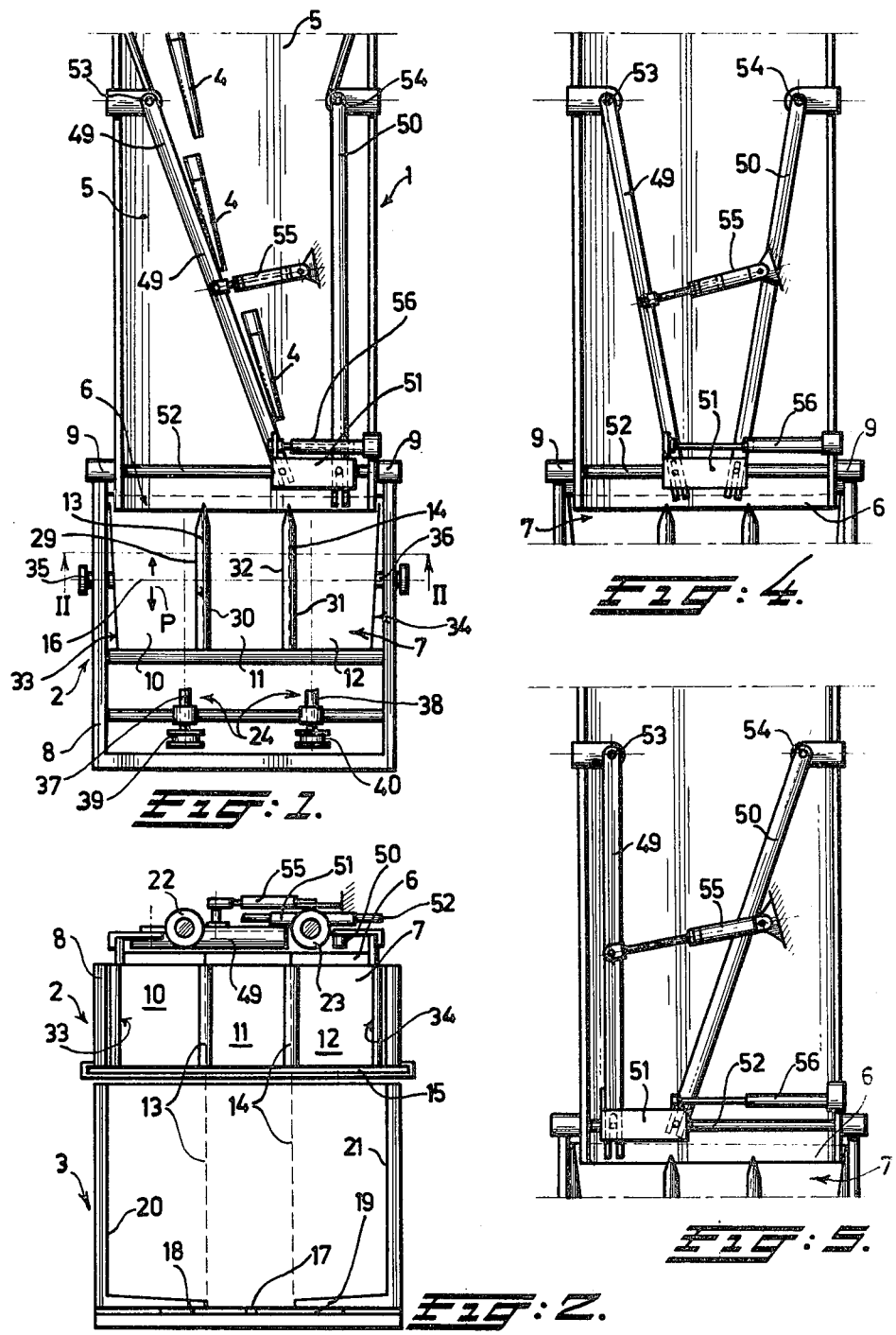

APPARATUS FOR FILLING A RECEPTACLE, PARTICULARLY WITH SPINNING BOBBINS

BACKGROUND OF THE INVENTION

The invention relates to an apparatus for filling a receptacle with oblong articles having an identical shape and being parallel with respect to each other, such that their extreme ends are positioned in two mutual parallel end planes. The invention particularly relates to a space for receiving conical articles, like yarn bobbins, their base sections being all on the same side or by turns.

DESCRIPTION OF THE PRIOR ART

A device for directing spinning bobbins before accommodating them in a receptacle is for instance known from German Offenlegungsschrift P 2 453 005. On gathering such articles in a receptacle the problem occurs that when they are dropped from the feed path toward the bottom of the receptacle their direction should not change thus that they assume a transverse position, so that an irregular filling of the receptacle occurs when automatic filling devices ae used. A very dependable solution of this problem is of great importance for filling receptacles designed for consecutive automatic delivery of the respective articles for further use. This is notably the case for receptacles for spinning bobbins, which receptacles in a known manner have a bottom opening, closeable by slides from which the bobbins are consecutively discharged to automatic devices and disposed on spindles of spinning machines.

SUMMARY OF THE INVENTION

The invention aims to provide, in conjunction with directing devices of the aforementioned kind, a solution for this problem, while it is a further object of the invention to provide an intermediate space or reservoir with a pull-out bottom destined therefor.

The apparatus according to the invention thereto comprises underneath the outlet end of a feed path for the articles, being provided at its receiving end with a directing device for the articles, an oblong intermediate space or reservoir with a pull-out bottom, the longitudinal axis of which is perpendicular to the longitudinal axis of the feed path, which space or reservoir has partitions subdividing the reservoir into compartments of which only the largest dimension is perpendicular to the longitudinal direction of the intermediate space or reservoir and corresponds with the longitudinal dimension of the articles, while over the surface of the feed path in the longitudinal direction thereof a pair of guide rulers is arranged, which are movable from a position in which the supply is exclusively guided toward a particular compartment of the intermediate reservoir, to a position in which this supply is exclusively guided toward another compartment.

SURVEY OF THE DRAWINGS

FIG. 1 is a plan view of the outlet of a supply path for articles and an intermediate space or reservoir positioned under the extreme end thereof, while some auxiliary parts are shown, among which a set of guide rulers above the outlet;

FIG. 2 is a section on line II—II in FIG. 1, in which also a receptacle under the intermediate space or reservoir is shown; frame parts are, however, omitted;

FIG. 3 is a plan view of the last mentioned receptacle;

FIG. 4 and 5 shows the outlet represented in FIG. 1 with guide ruler positions differing therefrom;

DESCRIPTION OF PREFERRED EMBODIMENTS

Figure 5:
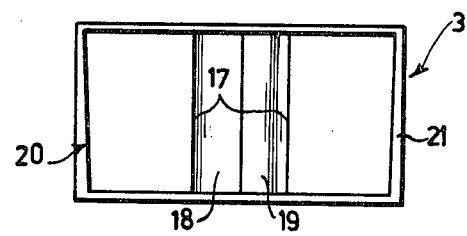

In the drawings the path for conveying articles is denoted by 1, the intermediate frame reservoir with accessories by 2 and the receptacle by 3.

FIG. 1 shows some spinning bobbins 4 being moved on a conveyor belt 5 to the outlet 6, their smaller cross section being directed toward that outlet. Underneath outlet 6 one longitudinal side of the oblong intermediate reservoir or space 7 is positioned which is integral with a frame 8. The flange-shaped ends 9 of the side girders thereof are detachably connected with the principal frame (not shown) of the apparatus with the conveyance path 1 for the articles.

Since the frame 8 carriers also the auxiliary parts, to be discussed hereinafter, of the intermediate space or reservoir 7, an individual unit 2 is formed which can also be affixed to existing machines with a conveyance path for articles and which is interchangeable.

The intermediate space or reservoir 7 is subdivided into three compartments 10, 11 and 12, by means of partitions the main element of which is a partition 13, 14, respectively (indicated by dotted lines). The bottom of the space or reservoir 7 is constructed as a dual sliding member, the two parts of which adjoining each other at line 16 in FIG. 1. The two parts of the slide can be pulled apart as indicated with the arrows P (as will be clarified hereinafter in FIG. 8) after the compartments 10, 11, 12 have been consecutively filled with a load of spinning bobbins 4.

Instead of the large receptacle 3 a box may be disposed under each of the compartments 10 and 12, the horizontal section through this box corresponding approximately to that of the associated compartment. The present apparatus is advantageous in that the two compartments 10 and 12 can be filled with a charge and simultaneously be discharged into the respective boxes by moving the sliding bottom part 15 to the open position. The desired position of the articles during their present descent is sufficiently maintained so that they assume the desired position in the boxes. The depth of the boxes exceeds the height of the charge and they are therefore filled by causing consecutively charges to descent thereinto. Thus a uniform position is ensured better than in case of the intermediate space or reservoir being made so high that an entire receptacle charge could be accommodated therein. It is obvious that without the use of an intermediate space or reservoir the hight of descent of the spinning bobbins would, at least during the beginning of the charging operation, be so great that they might tumble, so that the desired regular position would not be obtained.

The invention allows, however, particularly to fill larger receptacles 3 as is shown in FIGS. 2 and 3. Such oblong receptacles are used on a large scale for accommodating empty spinning bobbins in the desired regular position, whereby they can be removed therefrom one by one in automatic devices in order to be positioned on spindles of spinning machines. FIGS. 2 and 3 show in outline that the bottom to that end has a central opening 17 which is closeable by slides 18 and 19. By moving the slides apart, the spinning bobbins can fall one by one from the receptacle. In order to ensure a desired position and supply of the spinning bobbins the end walls 20 and 21 are inclined while the bottom also slants on either sides toward the opening 17.

On account of the large space occupied by the receptacle 3 in a longitudinal direction, one cannot be certain that the bobbins are regularly stacked when charges would be merely caused to fall simultaneously from the compartments 10, 11 and 12 of the intermediate reservoir into the receptacle. So as to obviate this difficulty the partitions 13 and 14 of the intermediate space or reservoir 7 are constructed thus that they can be extended as far as the bottom of the receptacle 3 and pulled up therefrom, as is indicated in FIG. 2 by means of dotted lines 13 and 14.

In theory rigid partitions of sufficient height could be used therefor of which a part would then protrude upwards beyond the intermediate space or reservoir 7 in a pulled up position. A much preferred solution, however is obtained in the represented embodiment (see also FIG. 7), according to which each upwardly movable partition 13, 14 is a curtain which can rolled up about a roller 22, 23 mounted on top of the intermediate space or reservoir 7, these rollers having a common drive 24.

The curtains 13, 14 may consist of strong textile material and are weighted at their lower border, for instance by means of leaden strips 25, 26, in the seams 27, 28 of the curtains.

The flexibility of the curtain material appears to be further advantageous with respect to rigid partitions, in that bobbins of different charges can be adapted in the receptacle 3, thus that they assume the correct position more easily.

In the intermediate space or reservoir 7 the curtains 13, 14 are bounded by pieces of plate 29, 30, and 31, 32, respectively, which facilitate the introduction of the bobbins and properly guide the curtains when the latter are lowered or pulled up.

FIG. 1 shows that the outer pieces of plate 29, 31 are curved toward each other on the side directed toward the supply path, so that on the inlet side of the bobbins, the plates are directed according to the direction of the guide rulers along which the bobbins 4 are introduced. Inner pieces of plate 33, 34 are mounted on spindles on the two end sides of the space or reservoir 7, these spindles being adjustable from outside and capable of being secured by means of a screw (the spindles are only diagrammatically shown in FIGS. 1 and 8 and denoted by 35 and 36). The plates 33 and 34 can be slantingly arranged so as to adapt them to the conical shape of the bobbins; on accound of their adjustability the width of the compartments 10 and 11 can be adjusted as well. In conformity therewith the partitions 29–31 and the curtains 13, 14 with their rollers 22, 23 can also be adjustably arranged.

Figure 6:
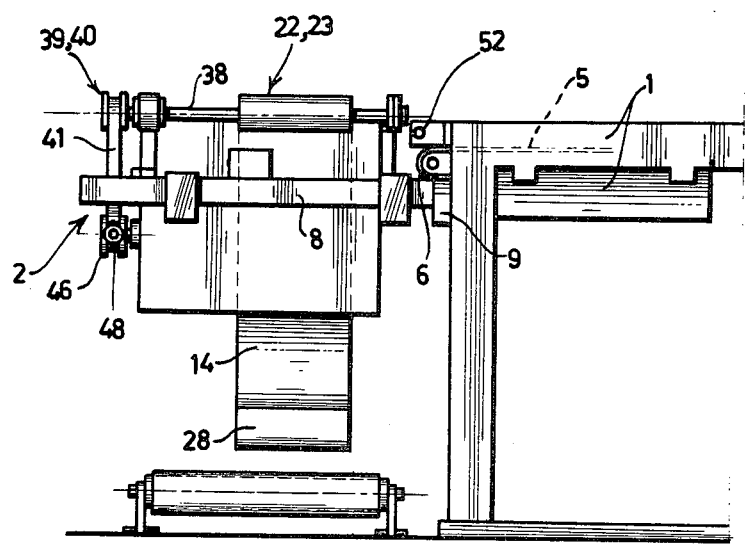
FIG. 6 is a side elevation to FIG. 2, wherein the receptacle is omitted.
Figure 7:
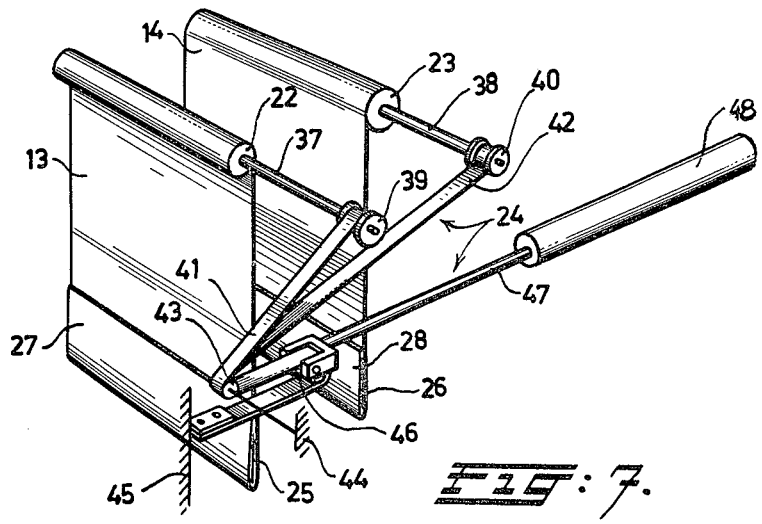
FIG. 7 shows a perspective view of a detail on a larger scale than in the preceding Figures.

In FIG. 1 the shafts 37 and 38 of the rollers are partially diagrammatically represented, and their centre line by a dot and dash line (see also FIGS. 6 and 7). FIG. 1 shows also the bearing on one side on a girder of frame 8 and FIG. 6 shows a corresponding bearing on the other side. FIGS. 1, 6 and 7 also show driving discs 39 and 40, while FIG. 7 shows the drive being effected through driving bands 41 and 42, running mutually over a guide roller 43 which, as is shown at point 44, is supported on the frame (see also FIG. 8). Bands 41 and 42 further extend mutually through a loop slung round a roller 46, to a fixed clamping point 45. The roller 46 is mounted at the end zone of the plunger 47 of a pneumatic operating cylinder 48. When the plunger is retracted the curtains 13, 14 are pulled up. Lowering the curtains can be effected by the weighting elements 25, 26, whereby the plunger is moved out again. It is conceivable that the latter is simultaneously driven, in order to decrease the friction and/or that the rollers 22, 23 are also driven by a spring (not shown) which is stressed when the curtains are pulled up.

So as to pass the spinning bobbins 4 consecutively to the various compartments 10–12 of the intermediate space or reservoir 7, a pair of guide rulers 49 and 50 is arranged over the conveyor track 5, which are connected by a plate 51 at their discharge end. This plate is horizontally slidable on a guide 52 and the ends of rulers 49 and 50 are slotted, so that pins protruding from plate 51 are guided in the slots. The rulers are thus kept at a particular distance from each other, while they nevertheless are capable of performing movements from the position represented in FIG. 1 toward that as shown in FIGS. 4 and 5 or vice versa. It is obvious that in each of these positions another compartment of the intermediate space or reservoir 7 is filled. The rulers pivot at their other ends about pivotal points 53 and 54 on the frame and they are actuated by pneumatic cylinders 55 and 56. From comparing FIGS. 1, 4 and 5 follows that the movement from the position in FIG. 1 is performed according to that in FIG. 4 because the cylinder 56 is energized, whereby the plunger of cylinder 55 is pulled outwards over some distance, while a further movement from the position in FIG. 4 to that in conformity with FIG. 5, is performed due to the cylinder 55 being energized. A return from the latter position through the one in FIG. 4 to that as shown in FIG. 1 can be effected by an energized return of the plunger of cylinder 55.

Figure 8:
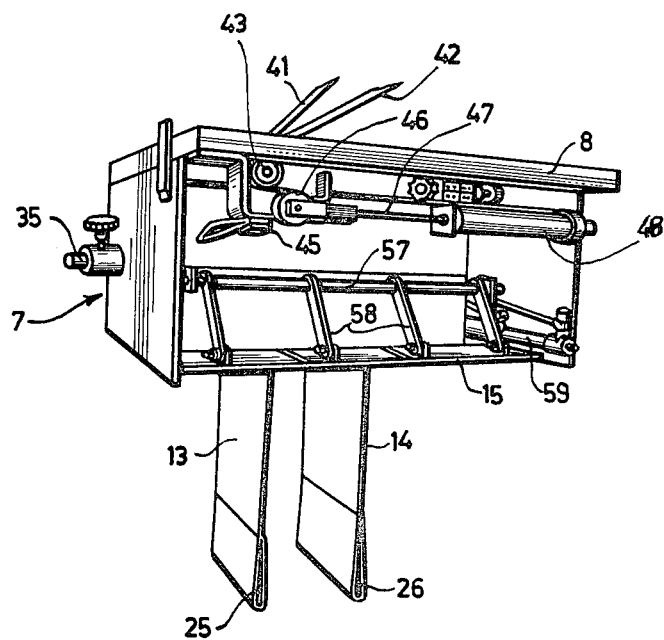
FIG. 8 shows a perspective end view of a detail of FIG. 2, however, on a slightly larger scale.

FIG. 8 still shows a part of the motion mechanism for one of the slides of the bottom 15, the slide on the other side being operated correspondingly by rotation of a shaft 57 which, by means of arms 58, is connected with the edge of one half of the slide 15. The actuating cylinder mounted on the frame, is denoted by 59.

Obviously a regulating system is provided so that actuation of the various pneumatic cylinders is effected at desired times, while also control devices are used cutting out the operation when particular conditions are not met, for instance when a receptacle 3 is not present underneath the intermediate space or reservoir 7. The construction of such regulating and control systems is known per se, and will therefore not be elucidated hereafter.

The conception underlying the control of the operation is an initial counting system, counting the number of bobbins fed on the conveyor belt 5. A switch over of the guide rulers can then be effected when a particular number of bobbins has been delivered to one of the compartments 10–12, which number determines the size of a charge of a compartment. When the number for a charge of all three compartments has been counted, the bottom 15 is pulled out, and the supply is discontinued for a short period of time until the bottom is positioned once again. In spite of these interruptions the total number of bobbins to be delivered to the receptacle 3 can then be counted, after which the process is interrupted for causing the last charges to be delivered and for replacing the filled receptacle by an empty one.

I claim:

1. A device for filling a receptacle with oblong articles parallel to each other with their extremities positioned in two mutual parallel end planes comprising a feed path means for feeding the articles, directing means for transversely directing said articles on said feed path means, an elongated intermediate space operative to receive said articles from said directing means, a pull-out bottom in said elongated intermediate space operative to periodically release said oblong articles, said intermediate space having at least one upwardly movable partition subdividing said intermediate space into at least two compartments said at least one partition having a length which substantially corresponds with the longitudinal dimension of the oblong articles, said directing means being operative to supply said oblong articles to a particular compartment of the intermediate reservoir, and alternately to supply said oblong articles to another compartment.

2. The device as defined in claim 1, in which said at least one upwardly movable partition extends in a direction transverse to the longitudinal direction of the intermediate space, and in which said at least one partition can be extended as far as the bottom of oblong receptacle and in a position parallel to the longitudinal axis of the intermediate reservoir and wherein said at least one partition can be pulled up from said bottom.

3. A device as defined in claim 2, further comprising a roller associated with said at least one partition mounted on the upper side of the intermediate space, said at least one partition being a curtain which can be rolled up about said roller, said roller being provided with a drive.

4. A device as defined in claim 3, further comprising a weighting member in the lower border of the curtains.

5. A device as defined in claim 3, further comprising guide means for guiding the curtains within the intermediate space, said guide means having end zones directed toward the feed path, being curved according to the position of the corresponding directing means assumed for filling the respective compartment.

6. The device as defined in claim 1, wherein the intermediate space is subdivided into three almost identical compartments whilst pieces of plate forming a part of the two partitions are slanted toward each other on the side directed toward the feed path.

7. A device as defined in claim 6 further comprising drive means for the curtains and for the pull-out bottom said drive means being mounted on the frame of the intermediate space whereby they can be mounted and removed as an assembly.

8. In a device for depositing oblong articles of mutually corresponding shape from a supply track having an exit into an oblong collecting magazine which is removable from the said device, the combination comprising article receiving means below the track exit intermediate between the latter and the space for accommodating the said removable magazine, said intermediate article receiving means being provided with a bottom gate, means for opening and closing said bottom gate, extendible band means adapted to limit the sideward movement of the said articles on the way from the said track exit into said magazine, means for lowering and raising said band means between a position wherein they reach into the said magazine and a position thereabove the said band means extending parallel to each other through the width of the said intermediate article receiving means and substantially parallel to the short walls thereof dividing it into oblong compartments, the height of the said article receiving means being so much smaller than that of the said magazine that the latter can only be filled by several subsequent loads from the said article receiving means, guides over said supply track, said guides being actuatable to cause said articles to move continuously in single file onto different positions laterally of the said track at the exit thereof each above one of said compartments.

9. A device as defined in claim 8 further comprising said band means being each formed by a curtain which is attached at its upper end to a roller mounted on the upper side of the said intermediate article receiving means, said rollers being provided with drive means.

10. A device as defined in claim 9 further comprising a weighting member in the lower border of the said curtains.

11. A device as defined in claim 8 further comprising said band means being each formed by a curtain which is guided within the article receiving means, a pair of parallel plates, the edges of each of said pair of plates at the side of the said supply track being slanted inwardly towards each other into a plane corresponding with one side of said supply track guide at its supply end in one of its different open positions.

12. A device as defined in claim 9 further comprising drive means for said curtains and for said bottom gate, said drive means being mounted on the frame of said article receiving means to form a unit therewith adapted to be mounted as a whole in the said device.

* * * * *